Patented Mar. 2, 1943

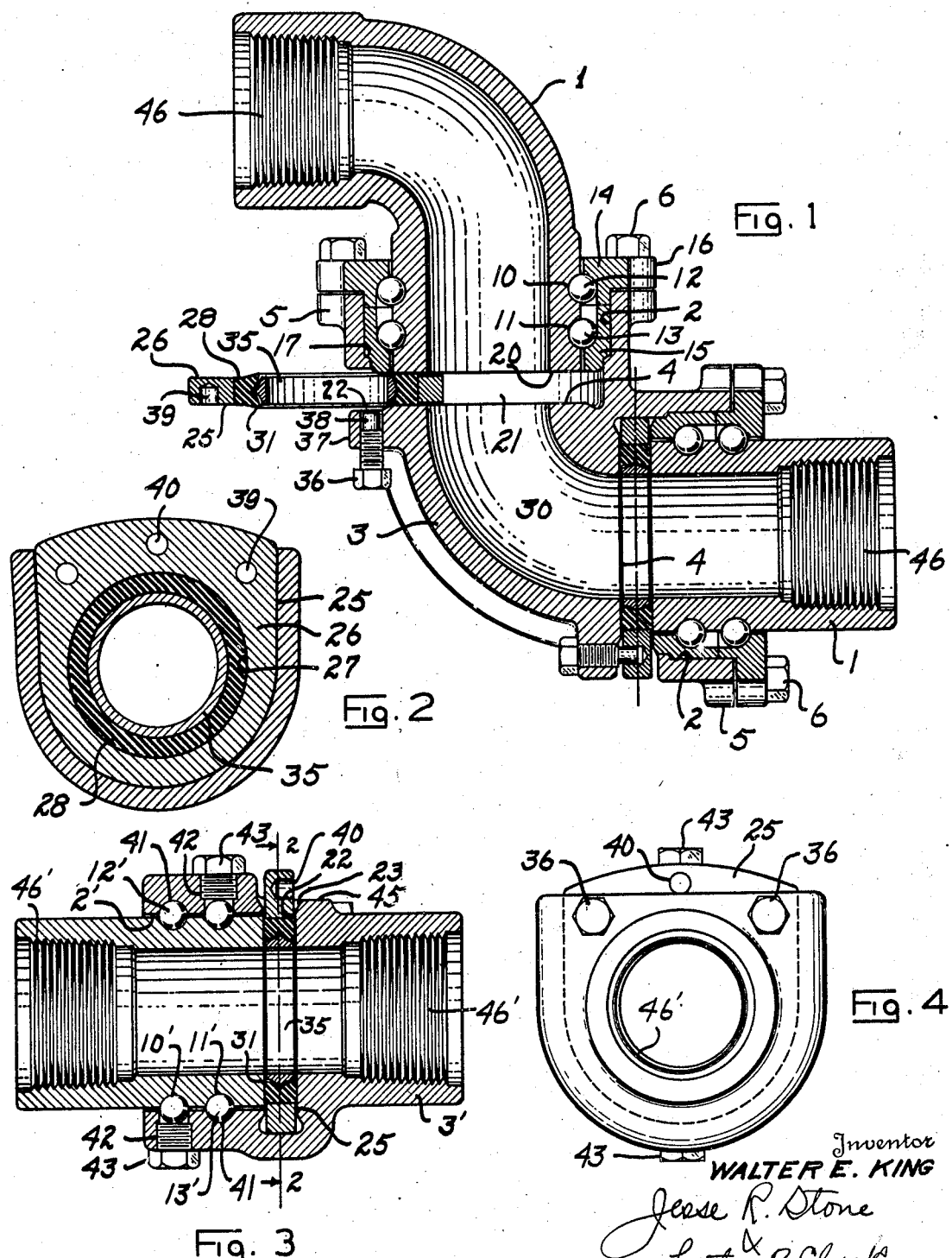

2,312,341

UNITED STATES PATENT OFFICE 2,312,341

PACKED SWIVEL JOINT

Walter E. King, Houston, Tex.

Application March 4, 1939, Serial No. 259,745

7 Claims. (Cl. 285—97.8)

This invention relates to swivel joints and more particularly to swivel joints between sections of fluid carrying conduits and the provision of means for forming an adequate seal between such sections at the joint.

A general object of the invention is to provide an improved packed swivel connection between sections of a fluid carrying conduit.

Another object is to provide a swivel connection which may be readily assembled and which is so constructed that the sections thereof are held in fixed axial relation.

Another object is to provide a swivel joint in which sealing means may be readily removed and replaced without dismantling.

Still another object is to provide a novel sealing assembly for insertion between sections comprising the swivel joint to provide a fluid seal therebetween.

With the foregoing objects as primary objects the invention has particular reference to the novel construction exemplified by the following description in connection with the drawing in which:

Fig. 1 is a sectional view thru a construction illustrating one embodiment of the invention.

Fig. 2 is a sectional view on line 2—2 of Fig. 3 illustrating the relation of parts of the sealing assembly.

Fig. 3 is a sectional view of a thru type swivel connection embodying the invention.

Fig. 4 is an end view of the construction shown in Fig. 3.

The invention as illustrated in Fig. 1 comprises male conduit members 1 which fit within counterbored enlargements 2 in the ends of the female conduit member 3 whereby there is provided outwardly facing shoulders 4. The ends of the member 3 are provided with ears 5 having threaded openings so that members 1 may be secured in place by means of cap screws 6 in a manner that will be made more fully apparent.

Each of the conduit members 1 is provided with spaced peripheral grooves 10 and 11 which serve as raceways for series of ball bearings 12 and 13. These ball bearings are respectively surrounded by angular raceways 14 and 15 of which the former are provided with ears 16 which are complementary to the ears 5 on the member 3. The outer surface of the raceway 15 is provided with a shoulder 17 to engage a complementary shoulder within the enlarged bore 2.

A swivel connection is effected by means of the construction just described by first assembling the series of balls 12 and 13 within the grooves 10 and 11 and then sliding the raceways 14 and 15 into position to hold these balls in place. This assembly is then inserted into the bore 2 until the shoulder 17 engages the complementary shoulder within the enlargement 2. Cap screws 6 are then tightened to form a rigid yet rotatable connection between the members 1 and 3. It is here noted that this construction definitely fixes the relative axial position of these members with the end 20 of the male member 1 in spaced relation with the bottom or shoulder 4 within the female member 2 whereby there is formed an annular groove which is generally designated as 21.

The sealing assembly 25 comprises a plate member 26 of such dimensions and configuration as to be insertable into the slot 22 and groove 21 and closely fit the walls thereof. This plate is provided with an opening 27 to receive a seal ring 28 having an inner diameter which is preferably slightly greater than the diameter of the bore 30 thru the conduit members 1 and 3. The inner face of the seal ring 28 is provided with outwardly flaring lips 31 so that fluid pressure exerted thereon will cause the lips to move outwardly into sealing engagement with the walls of the groove 21.

An inner metal ring 35 is positioned within the seal ring 28. The outer surface of this ring is substantially complementary to the inner surface of the seal ring 28. The inner surface of this ring is cylindrical and is of the same diameter as the bore 30 thru the conduit members 1 and 3. In this manner a uniform bore is maintained and losses thru throttling or eddies in the fluid are eliminated.

After the sealing assembly 25 has been placed within the slot 22 and the groove 21, it is secured in place by means of screws 36 threaded within boss 37 on the conduit member 3 and having end portions 38 which enter the openings 39 in the plate 26. In a later reference to Fig. 4 it will be noted that but two screws 36 are utilized, a third opening 40 being provided in the plate 26 to facilitate removal of the assembly when the screws 36 are withdrawn.

Attention is here directed to the fact that the slot 22 is provided with bevel edges at 23 so that the sealing ring 28 will be guided into the slot without injury thereto as the assembly 25 is inserted.

The thru type of swivel connection illustrated in Fig. 4 is very similar to that shown in Figs. 1 and 2 and like parts are designated by similar primed reference characters. In this embodiment the inner face of the enlargement 2' is also provided with spaced annular grooves 41 and 42 to form, with the grooves 10' and 11', raceways for balls 12' and 13'. Circumferentially spaced openings 42 are provided to enable the insertion of the balls 12' and 13' into the respective raceways. After the balls are in position these openings are closed by means of caps 43 to complete the swivel assembly.

This embodiment clearly shows the provision of an elevated surface 45 closely adjacent the opening 40 in the plate 26 whereby it is possible to insert a rod-like tool into the opening 40 and use such surface as a fulcrum so that the initial movement for removal of the assembly 25 may be effected after the screws 36 have been released.

It is to be understood that the members 1 of Fig. 1 and the members 1' or 3' of Fig. 3 may be of any desired length altho such members are shown provided with threads 46 whereby rigid conduits or hose may be connected thereto. It is also to be understood that while specific embodiments of the invention have been shown and described the invention is not confined to such embodiments nor to the specific use of the disclosed constructions since the invention broadly comprehends the provision of an improved swivel connection between sections of fluid carrying conduits which is so constructed that an efficient joint is provided and a joint in which it is possible to insert a sealing assembly without disturbing the swivel connection.

What is claimed is:

1. A swivel pipe or hose joint comprising a female conduit section having an enlargement in the end of the bore forming a shoulder therein, a male conduit section extending into said enlargement, bearing means between the male conduit section and the inner walls of said enlargement to swivelly connect said sections with the end of the male section and said shoulder in spaced parallel relation, a slot through the wall of the female member to form a passage to the groove defined by the bottom of the enlargement and the end of the male conduit section, and a seal assembly insertable into said slot groove to form a seal between the sections about the bore therethrough.

2. A swivel joint comprising a female conduit section having an enlargement in the end of the bore forming a shoulder therein, a male conduit section extending into said enlargement, bearing means between the male conduit section and the inner walls of said enlargement to swivelly connect said sections with the end of the male section and said shoulder in spaced parallel relation, a slot through the wall of the female member to form a passage to the groove defined by the bottom of the enlargement and the end of the male conduit section, a seal assembly insertable into said slot groove to form a seal between the sections about the bore therethrough, and means for securing the seal assembly within said slot and groove.

3. A swivel joint comprising male and female conduit members having a groove therebetween about a common bore, means swivelly interconnecting said members, a slot through the wall of the female conduit in the plane of said groove, and seal means insertable through said slot into the groove to form a seal between said members.

4. A seal assembly adapted to form a seal within a sealing chamber between swivelly connected conduit members comprising, a plate having an opening therein, a seal ring of yieldable material fitting within said opening, and an inner rigid ring floating within said seal ring to provide a uniform bore through the conduit members and assembly.

5. A swivel joint comprising two conduit members, a bell extension on one conduit member projecting over the end of the other conduit member, bearing means between the said extension and the interprojecting conduit member for swivelling movement of the members, said bearing means holding the ends of the conduit members in spaced relation, an opening in the extension radially opposite the space between the conduit ends, a packing between the conduit ends, and a means slidable through the said opening for positioning the packing between the conduit ends.

6. In a swivel joint for piping and the like, a female member, a male member to enter said female member, means to provide a radially open packing chamber between said members, a packing material carrier means insertable into said packing chamber through the radially open portion thereof, releasable means to secure the inserted carrier means against displacement, coupling means having a detachable engagement with said female member and a rotatable relation to said male member, and means to prevent relative axial movement between said coupling means and said male member, said latter means including anti-friction bearing means.

7. A swivel joint including a male and a female member, said members having a fluid conduit therethrough, the female member having an enlarged bore at one end, said bore being adapted to receive one end of the male member for a distance, means interposed between the periphery of the male member and the bore of the female member to interlock the said members against axial movement, said means permitting annular rotation, the female member having a radial slot and a plane face parallel to the said slot, the male member having a plane face parallel to the other plane face but spaced apart therefrom, a packing means having self-sealing lips and being adapted to seal against the plane faces, a carrier member surrounding the packing, said carrier and packing being slidable into position through the said slot, and a retainer for the carrier.

WALTER E. KING.